United States Patent Office 3,420,761
Patented Jan. 7, 1969

3,420,761
LOW TEMPERATURE IRRADIATION OF MONOMER IMPREGNATED CELLULOSIC BODIES
Arthur M. Feibush, Westfield, N.J., assignor to the United States of America as represented by the United States Atomic Energy Commission
No Drawing. Filed Aug. 29, 1966, Ser. No. 576,187
U.S. Cl. 204—159.12                  1 Claim
Int. Cl. B01j 1/10

ABSTRACT OF THE DISCLOSURE

A process for increasing the tensile strength and hardness of lignocellulosic bodies wherein the lignocellulosic body is impregnated with monemeric vinyl chloride and thereafter the monomer contained in the body is radiolytically polymerized, the impregnation and irradiation of the lignocellulosic body being carried out at temperatures below minus 50° C.

---

The invention described herein was made in the course of, or under a contract with the United States Atomic Energy Commission.

CROSS REFERENCE TO RELATED APPLICATION

U.S. patent application S.N. 391,810 filed Aug. 24, 1964, A. M. Feibush and H. P. Kieltyka.

STATE OF THE PRIOR ART

Processes for improving the tensile strength and hardness of lignocellulosic bodies, wherein the lignocellulosic body is impregnated with a monomer and thereafter the monomer is polymerized in situ by the use of irradiation are well known to those skilled in the art. In U.S. application S.N. 391,810, a process for producing lignocellulosic bodies having an increased tensile strength and enhanced color wherein the atmospheric pressure on a lignocellulosic body was reduced to a pressure of less than 1 x 10⁻³ cm. of mercury, contacting the lignocellulosic body with dye containing vinyl chloride monomer until the body was impregnated with the dye containing monomer, thereafter irradiating the impregnated body in order to polymerize the monomer contained therein. The process disclosed in the cited application has the disadvantage of requiring that pressure vessels must be employed to carry out the process. This disadvantage is unsatisfactory from an economic standpoint when it is desirable to treat large pieces of wood in quantity.

In conventional processes for producing wood-plastic compositions, a pressure vessel is required to contain the monomer within the vessel when it is desired to impregnate the wood with a relatively cheap monomer such as vinyl chloride because of the relatively high vapor pressure of vinyl chloride at room temperature.

It is an object of this invention to provide those skilled in the art with a method of producing vinyl chloride wood combinations wherein a pressure vessel is not required to carry out the process.

DESCRIPTION OF THE INVENTION

This invention provides those skilled in the art with an improvement in a process for increasing the tensile strength of lignocellulosic bodies, wherein the lignocellulosic body is impregnated with monomeric vinyl chloride and thereafter the impregnated body is subjected to irradiation with from about 1.75 to 6 megarads of high energy radiation at rates ranging from about 1.6 to about 10 rads per second, the improvement comprising maintaining the temperature of the vinyl chloride and the lignocellulosic body at a temperature below minus 50° C., during the impregnation and irradiation steps of the process. My novel process eliminates the need for costly pressurization equipment and enables those skilled in the art to produce the wood-plastic products in many shapes and sizes which could not be produced because of economic and space limitations found in conventional systems. The lower temperatures found useable in this invention result in the formation of a polymer having a higher molecular weight than corresponding polymers formed at room temperature.

Although the amount of compound desirable in the wood structure will vary with the intended use of the treated material, the presence of 1 to 75 percent by weight of the vinyl chloride is considered preferable for most purposes.

When it is desired to impart color to the wood product, a dye or other coloring agent, which is soluble in vinyl chloride, is suitably incorporated in the vinyl chloride monomer with which the wood is treated.

By employing the treatment of the present invention, the physical properties, including strength and hardness of wood, can be favorably improved. In carrying out this process, the vinyl chloride is effectively introduced into the wood without need of a solvent. The polymerization of the vinyl chloride in the wood by the subsequent irradiation brings about an increase in the strength and hardness of the wood of from about 5 to 100 percent or more. The percent increase in strength or hardness depends in part on the weight of the vinyl chloride retained by the wood. The process of the present invention is fully applicable to commercial wood treatments where relatively large cross-sectional areas are involved.

To obtain the desired impregnation of the wood all that is required is that the lignocellulosic body be immersed in the vinyl chloride monomer while maintaining the temperature of the body and monomer at a temperature below minus 50° C. The immersion impregnation step can be conducted at atmospheric or at super atmospheric pressure. Thus the monomer and body can be encased in a plastic envelope during the impregnation and irradiation steps of my novel process.

The preferred conditions for treatment will depend on the particular wood or wood product, the dimensions thereof, the type and degree of irradiation and, in some instances, other factors. After an immersion period in the vinyl chloride which may vary widely, e.g. from 1 to 60 minutes or more, depending upon the type of wood and the extent and amount of impregnation desired, the free vinyl chloride is drained from the treating vessel. The impregnated cellulosic body is then exposed to ionizing radiation while maintaining the temperature of the body below minus 50° C. for a suitable period of time to bring about polymerization providing a bonding or other association between the vinyl chloride and the cellulosic material.

In selecting a suitable radiation source, high-energy particulate radiation or high-energy electromagnetic radiation is suitably employed. Thus, there may be employed atomic particles, neutrons, photon, gamma rays, X-rays, electrons, deuterons, and fission fragments from nuclear reactors or accelerators, or from artificial or natural radioactive isotopes. The selection of the radiation source will be governed by the dimensions of the body being treated. Good results have been obtained by irradiation from sources emitting from 1.6 to 10 rads/sec. such as cobalt-60 source at dose rates up to 36,000 rads/hr. although higher rates dose can be used effectively. Wood or wood products may be irradiated up to a dose of 6 megarads. Irradiation at doses greater than 10 megarads may cause degradation of the cellulosic structure or of the polymer.

After the irradiation step, the treated cellulosic body is ready for use and can be subjected to any of the conventional wood working operations, e.g. cutting, planning, drilling, sanding, and the like. The treated wood can be worked more easily than ordinary wood and does not require finishing agents. A satin smooth surface is easily obtained by sanding. Removal of a surface layer does not alter the properties of the wood because the polymer is uniformly distributed in the wood.

The following specific examples are given to illustrate the practice of my invention:

Example 1

Lengths of sugar pine ¾ inch by one inch in cross section, and 5 inches long, were weighed and placed in polyethylene bags or plastic topped glass jars slightly larger than the wood samples. The containers were filled with liquid vinyl chloride maintained at −78° C. After closing the containers, they were packed into a bed of Dry Ice and were left undisturbed for one-half hour. The containers packed in Dry Ice were exposed to the radiation from a cobalt-60 source. The dose rate was 28,000 rads per hour. Exposure required to obtain polymerization was 1.7 megarad. After removal from the radiation source, the containers were removed from the Dry Ice and warmed to room temperature. Excess poly (vinyl chloride) on the outside of the wood was removed, and the wood was ready for further use as desired without any further treatment. In this manner, samples of sugar pine were produced containing quantities of poly (vinyl chloride) ranging from 13% to 100% of the original weight of the wood. These samples could not be distinguished with respect to appearance and general properties from the products produced by the process of U.S. patent application S.N. 391,810.

Example 2

The procedure of Example 1 was repeated, except that a length of Douglas fir was substituted for the sugar pine, and the product contained 31% of poly (vinyl chloride) based on the original weight of the wood.

Example 3

The procedure of Example 1 was again repeated, using corresponding lengths of rock maple in place of sugar pine, and the products produced contained poly (vinyl chloride) ranging from 11 to 58% by weight.

Example 4

Again the procedure of Example 1 was repeated, this time with a length of virola, to produce a product containing 110% by weight of poly (vinyl chloride).

Example 5

In the process of Example 1, corresponding lengths of redwood were substituted for the sugar pine and there were obtained products containing from 33 to 122% by weight of poly (vinyl chloride).

Example 6

When the procedure of Example 1 was repeated, using lengths of basswood instead of sugar pine, there were obtained products containing from 98 to 138% by weight of poly (vinyl chloride) based on the original weight of the basswood samples.

Example 7

Applying the procedure of Example 1 to corresponding lengths of white oak, products were produced containing from 6.7 to 28% by weight of poly (vinyl chloride).

Example 8

Lengths of red cedar were substituted for the lengths of sugar pine in the procedure of Example 1, and there were obtained products containing poly (vinyl chloride) in an amount ranging from 3 to 25% based on the original weight of the wood samples.

As in the case of Example 1, the products of Examples 2 to 8 could not be distinguished with respect to appearance and general properties from products made by the process of U.S. patent application S.N. 391,810. These examples show the introduction of poly (vinyl chloride) in amounts up to 138% by weight of the impregnated wood. It is possible to introduce even greater quantities, for example up to about 200% in some cases, generally by allowing the wood to soak for substantial periods of time in the vinyl chloride monomer prior to irradiation. The character of the wood is also a factor, and hard woods generally accept less monomer than soft woods.

I claim:

1. In a process for increasing the tensile strength and hardness of lignocellulosic bodies; wherein the lignocellulosic body is impregnated with monomeric vinyl chloride and thereafter the impregnated body is subjected to irradiation with from about 1.75 to 6 megarads of high energy radiation at rates ranging from about 1.6 to about 10 rads per second, the improvement comprises maintaining the temperature of the vinyl chloride and the lignocellulosic body at a temperature below minus 50° C. during the impregnation and irradiation steps of the process.

References Cited

UNITED STATES PATENTS 3,077,418  2/1963  Kenaga _____ 204—159.12
3,077,419  2/1963  Kenaga _____ 204—159.12

SAMUEL H. BLECH, *Primary Examiner.*

R. B. TURER, *Assistant Examiner.*

U.S. Cl. X.R.

117—93.31; 204—160.1; 260—17.4